United States Patent [19]
Schmidt et al.

[11] Patent Number: 5,037,952
[45] Date of Patent: Aug. 6, 1991

[54] PROCESS FOR THE PRODUCTION OF HIGH MOLECULAR WEIGHT, OPTIONALLY BRANCHED POLYARYLENE SULFIDES

[75] Inventors: Manfred Schmidt; Erhard Tresper; Wolfgang Alewelt; Ernst-Ulrich Dorf; Wolfgang Rüsseler, all of Krefeld, Fed. Rep. of Germany

[73] Assignee: Bayer Aktiengesellschaft, Leverkusen, Fed. Rep. of Germany

[21] Appl. No.: 434,221

[22] Filed: Nov. 13, 1989

[30] Foreign Application Priority Data

Nov. 23, 1988 [DE] Fed. Rep. of Germany ....... 3839444

[51] Int. Cl.$^5$ .............................................. C08G 75/14
[52] U.S. Cl. .................................................. 528/388
[58] Field of Search ......................................... 528/388

[56] References Cited

U.S. PATENT DOCUMENTS 3,354,129 11/1967 Edmonds, Jr. et al. ............ 528/388

Primary Examiner—Harold D. Anderson
Assistant Examiner—Terressa M. Mosley
Attorney, Agent, or Firm—Connolly & Hutz

[57] ABSTRACT

The invention relates to a process for the production of high molecular weight, optionally branched polyarylene sulfides having a low content of organically bound halogen. They are prepared by reaction of alkali sulfides and/or alkali hydrogen sulfides with aromatic dihalogen compounds in a polar organic solvent.

12 Claims, No Drawings

PROCESS FOR THE PRODUCTION OF HIGH MOLECULAR WEIGHT, OPTIONALLY BRANCHED POLYARYLENE SULFIDES

This invention relates to a process for the production of high molecular weight, optionally branched polyarylene sulfides (PAS), preferably polyphenylene sulfide (PPS), having a reduced content of organically bound halogen. They are prepared by reaction of alkali sulfides and/or alkali hydrogen sulfides with aromatic dihalogen compounds in a polar organic solvent.

Polyarylene sulfides and their production from the starting components mentioned above are known (cf. for example U.S. Pat. No. 3,354,129, EP-OS 171 021).

Polyarylene sulfides are high-temperature-resistant polymers. They are used, for example, in high-technology fields, for example in the electrical/electronics field. Applications such as these impose stringent demands, for example, on the purity and stability of a polymer.

The polyarylene sulfides produced by known processes are mainly terminated by mercapto or mercaptide groups and halogen.

The negative effect of mercapto or mercaptide groups in the polymer and measures for its elimination are known (cf. for example JP-OS 62/048 727 and EP-P 53 344).

Terminal halogen groups in the polymer can be potentially eliminated or saponified during the processing and use of the polymer. In this way, the electrolyte content of the polymer can be increased to such an extent that, for example, applications in the electronics field are hardly possible.

Processes for the production of PPS in the presence of mercaptans are known (cf. for example EP-OS 215 273). However, nothing is known of the chlorine content of the products produced by this process. In addition, the generally foul-smelling and readily oxidizable mercaptans are technically difficult to handle.

The present invention relates to a process for the production of high molecular weight, optionally branched polyarylene sulfides, preferably polyphenylene sulfide, from a) one or more (hetero)aromatic dihalogen compounds corresponding to formulae (I) and/or (II),

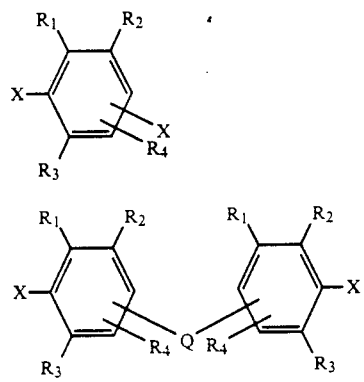

in which
X is halogen (for example chlorine, bromine)
$R^1$ to $R^4$ may be the same or different and represent hydrogen, $C_{1-20}$ alkyl, $C_{3-20}$ cycloalkyl, $C_{6-24}$ aryl, $C_{7-24}$ alkylaryl and $C_{7-24}$ arylalkyl; two substituents R in the ortho position to one another may be attached to form an aromatic or heterocyclic ring containing 5 to 7 hetero atoms, such as N, O or S, and Q represents a single bond or groups with two bonds, such as —Ar—, —O—, —S—, —SO—, —SO$_2$—, —(CR$_2$)$_m$—, —CO—, —CO—Ar—CO—, —CO—NH—, —CO—NH—Ar—NH—CO—, where R is as defined above, Ar is a $C_{6-24}$ aromatic radical with two bonds and m is an integer of 1 to 24,
and b) 0 to 5 mol-% and preferably 0 to 1.25 mol-%, based on the sum of the aromatic dihalogen compounds of formula (I) and/or (II), of an aromatic trihalogen or tetrahalogen compound corresponding to formula (III)

$$ArX_n \qquad (III),$$

in which
Ar is an aromatic $C_{6-30}$ radical or heterocyclic radical containing 6 to 24 ring atoms, up to nine ring C atoms being replaceable by heteroatoms, such as N, O, S,
X represents halogen (for example bromine, chlorine) and
n is the number 3 or 4, and c) 50 to 100 mol-% alkali sulfide, such as sodium or potassium sulfide, and 0 to 50 mol-% alkali hydrogen sulfide, such as sodium or potassium hydrogen sulfide, the molar ratio of (a+b):c being from 0.75:1 to 1.15:1 and preferably from 0.90:1 to 1.1:1, d) in an organic solvent, optionally in the presence of catalysts and/or co-solvents, the molar ratio of c) to the organic solvent d) being in the range from 1:2 to 1:15, characterized in that the reaction is carried out by mixing of aqueous alkali sulfide and/or alkali hydrogen sulfide solutions with solutions of the aromatic dihalogen compounds in an organic solvent at temperatures above 212° C., in that the water content of the reaction solution is at most 0.02% by weight, aromatic halogen compound of formula (I), (II) or (III) distilling azeotropically with the water being returned to the reaction mixture, and in that unreacted aromatic halogen compounds corresponding to formulae (I), (II) and (III) are removed from the reaction mixture at the end of the reaction.

Examples of aromatic dihalogen compounds of formula (I) suitable for use in accordance with the invention are 1,4-dichlorobenzene, 1,4-dibromobenzene, 1-bromo-4-chlorobenzene, 1,3-dichlorobenzene, 1,3-dibromobenzene, 1-bromo-3-chlorobenzene, 2,5-dichlorotoluene, 2,5-dichloroxylene, 1,4-dichloro-2-ethyl benzene, 1,4-dibromo-2-ethyl benzene, 1,4-dichloro-2,3,5,6-tetramethyl benzene, 1,4-dichloro-2-cyclohexyl benzene, 2-benzyl-1,4-dichlorobenzene, 2,4-dichlorotoluene, 2,4-dichloroxylene, 2,4-dichlorocumene; 1,4-dichlorobenzene, 1,3-dichlorobenzene and 2,5-dichlorotoluene are preferred.

Examples of aromatic dihalogen compounds of formula (II) suitable for use in accordance with the invention are 4,4,'-dichlorodiphenyl 1,4,4,'-dibromodiphenyl,4,4,'-dichlorobenzophenone, 3,3,'-dichlorobenzophenone, 4,4,-dichlorodiphenyl sulfone, 1,4-bis-(4'-chlorobenzoyl)-benzene, 1,4'-bis-(3'-chlorobenzoyl)-benzene; 4,4'-dichlorodiphenyl, 4,4,-dichlorodiphenyl sulfone and 4,4,'-dichlorobenzophenone are preferred.

The aromatic dihalogen compounds corresponding to formulae (I) and/or (II) may be used individually or in admixture with one another.

Examples of aromatic trihalogen or tetrahalogen compounds of formula (III) suitable for use in accordance with the invention are 1,2,4-trichlorobenzene, 1,3,5-trichlorobenzene, 2,2',4,4'-tetrachlorodiphenyl, 2,2',4,4'-tetrachlorodiphenyl sulfide, 1,3,5-trichlorotriazine, 1,2,6-trichloronaphthalene and tris-(4-chlorophenyl)-benzene.

The alkali sulfides are used in typical quantities and in the usual way. Sodium or potassium sulfide is preferred. It is possible to use sulfides produced from the hydrogen sulfides with sodium or potassium hydroxide. They may contain 1 to 9 mol water per mol sulfide and may be used in the form of a melt, optionally together with catalysts.

Suitable hydrogen sulfides are sodium or potassium hydrogen sulfides. They may be prepared from hydroxides and hydrogen sulfide or from sulfides with hydrogen sulfide. They may contain from 1 to 4 mol water.

Organic solvents suitable for use in accordance with the invention are aprotic solvents, more especially N-alkylated lactams, for example N-ethyl pyrrolidone, N-methyl piperidone, N-isopropyl pyrrolidone, N-methyl capro-lactam, lactam, or disubstituted cyclic ureas, for example N,N-dimethyl pyrimidazolidinone and N,N'-dimethyl imidazolidinone. The boiling point of the solvents and the reaction mixture is in the range from 212° C. to 280° C. To reach the temperature range, the reaction may be carried out under a slight excess pressure (up to 10 bar).

Suitable co-solvents are, for example, N,N-dialkyl carboxylic acid amides of aliphatic $C_{1-8}$ and aromatic $C_{6-12}$ carboxylic acids which may be used in a quantity of from 0.02 to 1 mol per mol sodium or potassium sulfide, for example N,N-dimethyl acetamide, N,N-diethyl acetamide and N,N-dimethyl propionamide.

Suitable catalysts are any of the substances typically used for this purpose, for example alkali salts, such as halides, for example sodium or potassium fluorides, phosphates, carboxylates or capronates, which may be used in typical quantities, for example in quantities of from 0.02 to 1.0 mol catalyst per mol S donor.

To carry out the reaction, the solvent, the aromatic halogen compounds of formulae (I) and (II) and/or (III), optionally together with the catalysts and/or co-solvents, and the aqueous hydrogen sulfides and/or sulfides may be added to the reaction mixture simultaneously or successively. The temperature of the reaction mixture does not fall below 212° C. and may be increased to 350° C. and preferably to 300° C. Water is spontaneously removed. Aromatic halogen compounds of formula (I), (II) or (III) distilling off azeotropically are returned to the reaction mixture. The water content of the reaction mixture is thus 0 to 0.02% by weight.

The reaction time may vary over a wide range, amounting to between less than 1 hour and several days, preferably to between 1 hour and 48 hours and more preferably to between 2 and 18 hours. Unreacted aromatic halogen compounds are removed from the reaction mixture at the end of the reaction, for example by distillation.

The polyarylene sulfides are isolated, for example, by cooling, filtration and washing of the reaction mixture first with ketones, such as acetone, or alcohols, such as methanol, ethanol or isopropanol. The residue is suspended in water in a ratio of 1 part residue to 5-20 parts water, the suspension obtained is adjusted to pH 1-5 with acids, such as for example acetic acid, hydrochloric acid, phosphoric acid, sulfuric acid, and then washed with water until neutral. The polyarylene sulfides thus obtained have a very low content of organically bound halogen of from 0.001 to 0.09% by weight.

The content of organically bound halogen may be determined, for example, by differential determination from the total chlorine content (as determined, for example, by Wickbold combustion) and the chloride ion content (as determined, for example, by known argentometric methods).

The melt viscosities of the polyarylene sulfides produced by the process according to the invention, as a measure of their molecular weight, may be determined, for example, by the method described in EP-OS 142 024.

Other inorganic or organic oligomers or polymers, typical pigments and fillers, for example carbon black, graphite, metal powders, glass powder, quartz powder, mica, glass and carbon fibers or fibers of other inorganic or organic materials, inorganic fillers from the group of metal oxides or metal sulfides and other additives, for example stabilizers and/or mold release agents, may be added to the polyarylene sulfides produced in accordance with the invention.

The polyarylene sulfides produced in accordance with the invention or mixtures thereof may be directly processed by extrusion, extrusion blow molding, injection molding or other standard molding processes to form films, moldings or fibers. The end products obtained may be typically used, for example, as automotive components, fittings, valves, ball bearing components, electrical components, for example switches, electronic boards, parts resistant to chemicals and weathering and machine parts, such as pump housings and pump flywheels, etching baths, sealing rings, parts of office machines, communications equipment, domestic appliances, etc. The polymers are preferably used in the electrical and electronics field.

The use of the polymers produced by the process according to the invention for the encapsulation of electronic components, such as for example transistors, diodes, microchips, etc. is particularly preferred.

EXAMPLES

EXAMPLE 1

1382.4 g N-methyl caprolactam and 470.4 g (3.2 mol) 1,4-dichlorobenzene are introduced under nitrogen into a 4 liter tank and heated to 214° C. A solution of 197.3 g (2.53 mol) Na$_2$S and 73.4 g (1.31 mol) NaHS in 293.9 g water and 2.1 g phenol (water content of the solution=51.8% by weight) is then introduced over a period of 4 hours with stirring and azeotropic removal of water at a temperature of the reaction mixture of 213° to 217° C. The 1,4-dichlorobenzene distilling off azeotropically with the water is continuously returned to the reactor. Samples of the reaction mixture are dissolved in anhydrous methylene chloride after 1, 2, 3 and 4 hours and the water content determined.

| Sample after | H$_2$O content |
| --- | --- |
| 1 hour | <0.01% |
| 2 hours | <0.01% |
| 3 hours | <0.01% |
| 4 hours | <0.01% |

The temperature of the reaction mixture is then increased. The reaction mixture is refluxed for another 8 hours during which the internal temperature increases to 240° C. 50 ml N-methyl caprolactam and 23.7 g 1,4- dichlorobenzene are then distilled off. The reaction mixture is precipitated with stirring in 7,000 g isopropanol, salt and polymer are filtered off, the product is washed with 3,000 g isopropanol, the residue is suspended in 3,000 g water and the suspension is acidifed to pH 2 with concentrated sulfuric acid. The polymer is filtered off, washed repeatedly with water and dried in vacuo at 150° C. Yield: 319 g (=92.3%, based on the dichlorobenzene used). For determination of the melt viscosity and the chlorine content, see Table 1.

EXAMPLE 2

1340.2 g N-methyl caprolactam and 360.15 g (2.45 mol) 1,4-dichlorobenzene are introduced under nitrogen into a 4 liter tank and heated to 215° C. A solution of 215.3 g (2.76 mol) $Na_2S$ and 80.6 g (1.44 mol) NaHS in 321.4 g water (water content of the solution=52.1% by weight) is then introduced over a period of 4 hours with stirring and spontaneous azeotropic removal of water at a temperature of the reaction mixture of 218° to 222° C. The 1,4-dichlorobenzene distilling off azeotropically with the water is continuously returned to the reactor. 3 Hours after the beginning of the addition, 154.35 g (1.05 mol) 1,4-dichlorobenzene are introduced simultaneously with the sodium sulfide/hydrogen sulfide.

Samples of the reaction mixture are dissolved in anhydrous methylene chloride after 1, 2, 3 and 4 hours and are found to have water contents of or less than ($\leq$) 0.01% by weight.

The temperature of the reaction mixture is increased to 230° C. over a period of 30 minutes. After refluxing for another 8 hours, 50 ml N-methyl caprolactam and 24.6 g 1,4-dichlorobenzene are distilled off, the reaction system reaching a temperature of 242° C. The polymer is isolated as in Example 1 and polyphenylene sulfide is obtained in a quantity of 349.2 g (yield=92.4%, based on dichlorobenzene). For determination of the melt viscosity and chlorine content, see Table 1.

EXAMPLE 3

1382.4 g N-methyl caprolactam and 470.4 g (3.2 mol) 1,4-dichlorobenzene are introduced into a reactor of the type described in Example 1 under an excess nitrogen pressure of 50 mbar and heated to 215° C. A solution heated to 140° C. of 415.5 g (3.49 mol) sodium sulfide (water content=39.7% by weight) and 72.4 g (0.64 mol) $\epsilon$-caprolactam (=20 mol-%, based on dichlorobenzene), 1.5 g (0.016 mol) phenol (=0.5 mol-%, based on dichlorobenzene) and 87.5 g water are introduced over a period of 220 minutes with stirring and azeotropic removal of water under an excess nitrogen pressure of 60 mbar and at a reaction temperature of 216° to 219° C. and the 1,4-dichlorobenzene distilling off azeotropically with the water is continuously returned to the reaction mixture, samples being taken after 1, 2, 3 and 4 hours. All the samples have a water content of or less than 0.01% by weight. The temperature of the reaction mixture is increased to 230° C. over a period of 45 minutes. After refluxing for another 8 hours, 60 ml N-methyl caprolactam and 27.5 g 1,4-dichlorobenzene are distilled off, the reaction mixture reaching a temperature of 242° C. The polymer is isolated by the method described in Example 1. In the washes with water, the polymer is washed free from sodium chloride and sodium aminocapronate. Polyphenylene sulfide is obtained in a yield of 318 g (corresponding to a yield of 92%, based on dichlorobenzene). For determination of the melt viscosity and halogen content, see Table 1.

COMPARISON EXAMPLE 1

(Variant for direct comparison with the invention)

The procedure is as in Example 2, but without distillation in the final phase. For determination of the melt viscosity and halogen content, see Table 1.

COMPARISON EXAMPLE 2

Synthesis of polyphenylene sulfide in accordance with U.S. Pat. No. 3,354,129:

129 g sodium sulfide trihydrate (=1 mol sodium sulfide) and 300 g N-methyl pyrrolidone were combined in a stirrer-equipped autoclave. The mixture was purged with nitrogen and slowly heated to 202° C. A total of 10 ml water distills off (leaving a residual water content of 1.78 mol, based on sodium sulfide in the reaction solution). The mixture was then cooled to approximately 160° C. and 147 g 1,4-dichlorobenzene (=1 mol) in approximately 50 g N-methyl pyrrolidone added. The reaction mixture is heated to 245° C. over a period of 30 minutes under a nitrogen pressure of 2.5 bar and kept at that temperature for 3 hours. A final pressure of 14.5 bar is reached. After cooling to room temperature, a grey solid is isolated and then washed with water. Drying in vacuo at 80° C. gives 100.3 g (=93%) of light-brown poly-p-phenylene sulfide. The material cannot be molded without hardening. For determination of the melt viscosity and halogen content, see Table 1.

COMPARISON EXAMPLE 3

Synthesis of polyphenylene sulfide in accordance with EP-PS 142 024, Example 2:

1110 g N-methyl caprolactam, 30.3 g N,N-dimethyl acetamide, 341.1 g 1,4-dichlorobenzene (=2.23 mol) and 2.73 g 1,2,4-trichlorobenzene (0.65 mol-%, based on 1,4-dichlorobenzene) are introduced into a 2-liter three-necked flask equipped with a thermometer, stirrer, coolable column, distillate divider and reflux condenser and heated to 190°-200° C. A solution of 180.9 g sodium sulfide hydrate (=2.32 mol S donor) and sodium hydroxide in a total of 250 ml water (including water of hydration) is then added dropwise at such a rate that the water introduced can distill off azeotropically with 1,4-dichlorobenzene at almost the same time. To maintain stoichiometry, 1,4-dichlorobenzene distilled off is returned to the mixture after separation of the water. After the addition and after the separation of water, the column is switched to cooling, the mixture is heated for 10 hours to the reflux temperature and the product is isolated in the usual way. White polyarylene sulfide is obtained in a yield of 225.9 g (corresponding to 90.2%, based on 1,4-dichlorobenzene). For determination of the melt viscosity and halogen content, see Table 1.

TABLE 1

| | Comparative review | |
| --- | --- | --- |
| Example No. | Melt viscosity at T = 306° C. and D = $10^3$ s$^{-1}$ in Pa.s | Content of organically bound chlorine in % by weight |
| Example 1 | 100 | 0.06 |
| Example 2 | 484 | 0.04 |
| Example 3 | 81 | 0.05 |
| Comparison Example 1 | 417 | 0.21 |
| Comparison Example 2 | 4.5 | 0.54 |
| Comparison Example 3 | 120 | 0.31 |

We claim:

1. A process for the production of polyarylene sulfide from a) one or more (hetero)aromatic dihalogen compounds corresponding to formulae (I) or (II),

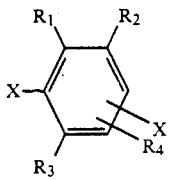

(I)

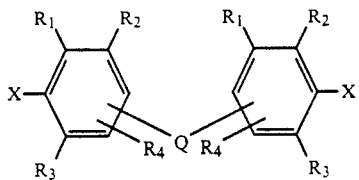

(II)

in which

X is halogen, $R^1$ to $R^4$ are the same or different and represent hydrogen, $C_{1-20}$ alkyl, $C_{4-20}$ cycloalkyl, $C_{6-24}$ aryl, $C_{7-24}$ alkylaryl and $C_{7-24}$ aryl-alkyl or two substituents $R^{1-4}$ in the ortho position to one another are attached to form an aromatic or heterocyclic ring containing 5 to 7 hetero atoms, and Q represents a single bond or O represents —Ar—, —O—, —S—, —SO—, —SO$_2$—, —(CR$^2$)$_m$—, —CO—, —CO—Ar—CO—, —CO—NH—, —CO—NH—Ar—NH—CO—, where $R^2$ is as defined above, Ar is a $C_{6-24}$ aromatic radical with two bonds and m is an integer of 1 to 24, and b) zero to 5 mol-%, based on the sum of the aromatic of formula (I) and (II), of an aromatic compound corresponding to formula (III)

ArX$_n$ (III)

in which

Ar is an aromatic $C_{6-30}$ radical or heterocyclic radical ring atoms, up to nine ring C atoms being replaceable X represents halogen and n is the number 3 or 4, and c) 50 to 100 mol-% alkali sulfide and 0 to 50 mol-% alkali hydrogen sulfide, the molar ratio of (a+b):c being from 0.75:1 to 1.15:1, d) in an organic solvent, optionally in the presence of catalysts or other solvents, the molar ratio of c) to the organic solvent d) being in the range from 1:2 to 1:15, wherein the reaction is carried out by mixing of aqueous alkali sulfide or alkali hydrogen sulfide solutions with solutions of the aromatic dihalogen compounds in an organic solvent at temperatures above 212° C., the water content of the reaction solution is at most 0.02% by weight, aromatic halogen compound of formula (I), (II), or (III) is distilled azeotropically with the water and returned to the reaction mixture, and unreacted aromatic halogen compounds corresponding to formulae (I), (II) and (III) are removed from the reaction mixture at the end of the reaction.

2. A process as claimed in claim 1, wherein the molar ratio of (a+b):c is from 0.9:1 to 1.10:1.

3. A process as claimed in claim 1, wherein the aromatic tri- or tetrahalogen compounds corresponding to formula (III) are uses in a quantity of from 0 to 1.25 mol-%, based on the sume of the aromatic dihalogen compounds corresponding to formulae (I) and (II).

4. A process as claimed in claim 1, wherein sodium sulfide, sodium hydrogen sulfide or a mixture thereof is mixed with the aromatic dihalogen compounds.

5. A process as claimed in claim 1, wherein N-methyl pyrrolidone is the organic solvent.

6. A process as claimed in claim 1, wherein N-methyl caprolactam is the organic solvent.

7. A process as claimed in claim 1, characterized in that N,N'-dimethyl imidazolidinone is used as the organic solvent.

8. A process as claimed in claim 1, characterized in that 1,4-dichlorobenzene, 1,3-dichlorobenzene and/or 2,5-dichlorotoluene is used as the aromatic dihalogen compound of formula (I).

9. A process as claimed in claim 1, wherein 4,4'-dichlorodiphenyl, 4,4'-dichlorodiphenyl sulfone, 4,4'-dichlorobenzo-phenone or a mixture thereof is the aromatic halogen compound of formula (II).

10. A process as claimed in claim 1, wherein ε-caprolactam is the catalyst.

11. A process according to claim 1 wherein the heteroatoms are N,S, or O.

12. A process according to claim 1 wherein the alkali hydrogen sulfide is sodium or potassium hydrogen sulfide.

* * * * *